United States Patent Office 3,213,449
Patented Oct. 19, 1965

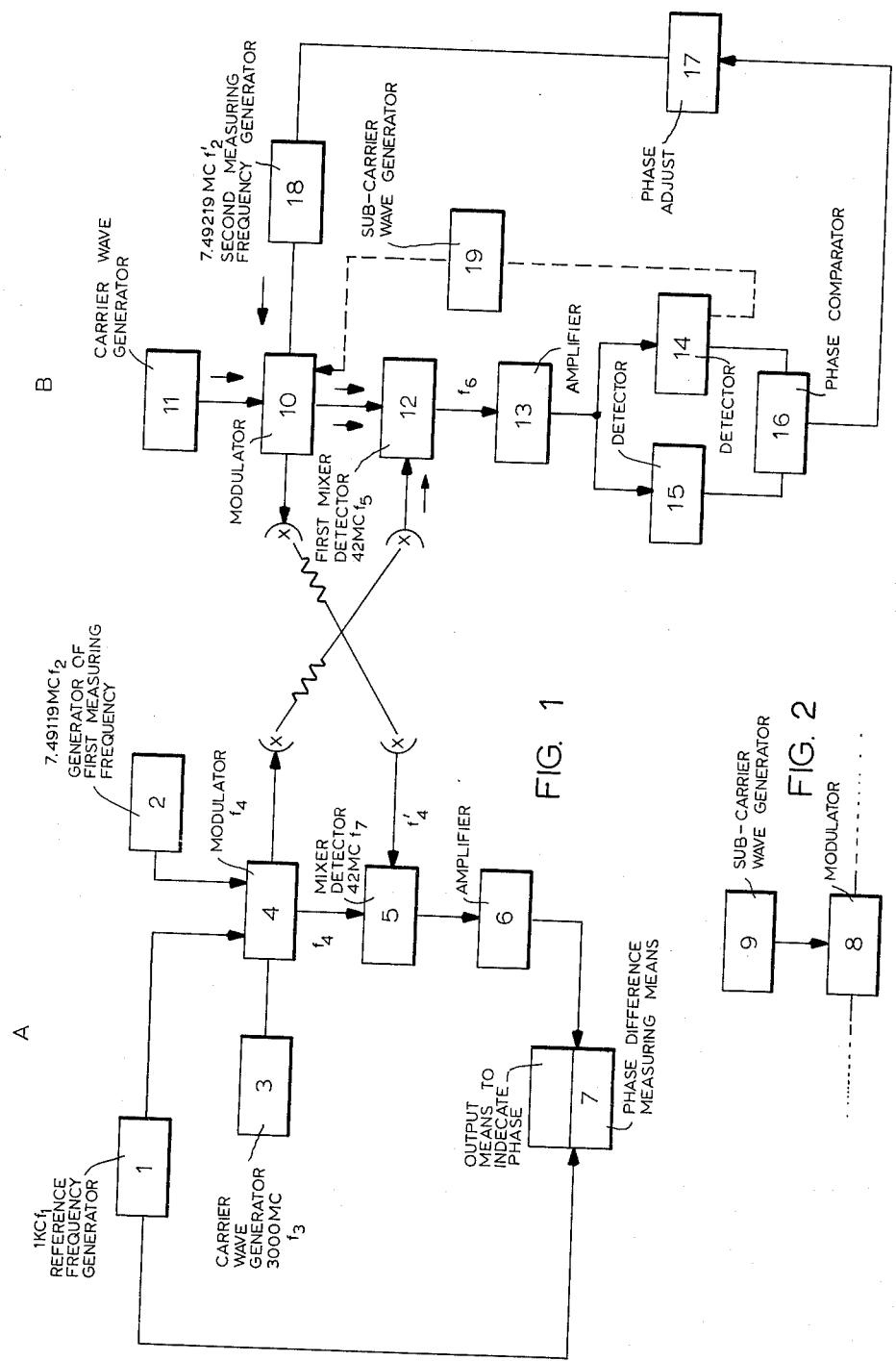

3,213,449
DISTANCE MEASURING SYSTEM
Kyoji Kobayashi, Kanagawa-ken, Takashi Enomoto, Saitama-ken, and Susumu Nojima, Tokyo, Japan, assignors to Anritsu Electronic Works, Ltd., Tokyo, Japan, a Japanese corporation
Filed Dec. 16, 1963, Ser. No. 330,832
Claims priority, application Japan, Dec. 15, 1962, 37/57,019
3 Claims. (Cl. 343—12)

This invention relates to a distance measuring system for measuring the distance between two given points by utilizing an electromagnetic wave.

Briefly stated, in accordance with this invention a low frequency wave is utilized which provides high accuracy for phase difference measurement irrespective of the frequency employed for distance measurement. Also, as one of the inputs for phase difference measurement a stable low frequency input is utilized which does not pass through transmission path. Difficulties encountered in sending back the wave at the second point are eliminated.

The objects and advantages of the present invention will become apparent and this invention will be better understood from the following description, reference being had to the accompanying drawing wherein FIGURE 1 indicates an electric circuit diagram of one embodiment of this invention; and, FIGURE 2 shows a block diagram of a modification to one of the components of FIGURE 1.

At first the principle of this invention will be considered. It will be assumed that at a master station positioned at the first point A a signal of reference frequency and a signal of a first measuring frequency are modulated by a carrier wave and transmitted to a slave station positioned at the second point B. At the second point B the carrier wave is modulated by a signal of the second measuring frequency and is then transmitted simultaneously with mixed detection of the signal coming from the first point A by means of the modulating carrier wave at the second point B. This will produce a wave of an intermediate frequency having a difference frequency of the carrier frequencies, from which a component having a difference frequency between the first and second measuring frequencies, or the first difference signal can be derived.

The difference between the first and second measuring frequencies is selected to be equal to the reference frequency or any multiple thereof, for example 2, 3, 4 . . . times thereof or ½, ⅓, ⅔, ¼ . . . thereof. At the second point B the phase of the signal of the reference frequency coming from the first point A and that of the difference signal obtained at the second point B are compared and the phase of the signal of the second measuring frequency is controlled so that the relation of the phases compared will have a predetermined relation. Also at the first point A, the signal transmitted from the second point B is mixed detected by means of the modulating carrier wave at the first point A to obtain a component of an intermediate frequency. At the same time a difference signal between the first and second measuring frequencies or the second difference signal is derived to obtain the distance from the phase difference or time difference between said second difference signal and the signal of reference frequency.

Referring now to FIGURE 1 of the accompanying drawing which illustrates one embodiment of this invention there are shown a reference frequency generator 1, a generator 2 of the first measuring frequency and a carrier wave generator 3 in the master station at the first point A. The reference frequency i.e., $f_1$ is equal to 1 kc., the first measuring frequency, i.e., $f_2$ 7.49119 mc. and the carrier wave frequency i.e., $f_3$ 3000 mc. Said signals of reference frequency $f_1$ and of the first measuring frequency $f_2$ are modulated in a modulator 4 by the carrier wave $f_3$ to be transmitted. Any suitable method of modulation can be used so long as it can produce side bands of the modulated signal in the carrier wave $f_3$. Instead of said double modulation a sub-carrier wave generated by a sub-carrier wave generator 9 can be modulated in a modulator 8 by the signal of reference frequency as schematically shown by FIGURE 2. In the following it is assumed that the reference frequency signal $f_1$ is a pulse of 1 kc. and that the amplitude modulated signal of the first measuring frequency $f_2$ effects the frequency modulation of the carrier wave.

Double modulated signal $f_4$ is transmitted by a first transmitting means (not shown) from the first point A to the second point B, and received by a first receiving means (not shown) in the slave station positioned at the second point B. In the station located at the second point B, 11 shows a carrier wave generator and 18 is a second measuring frequency generator.

For example, the carrier wave generator 11 generates a carrier wave frequency $f_3'$ of 3042 mc., and the second measuring frequency generator 18 generates a second measuring frequency $f_2'$ of 7.49219 mc. The signal of the second measuring frequency $f_2'$ modulates the carrier wave $f_3'$ in a modulator 10 to transmit it to the master station positioned at the first point A. This first modulated carrier wave $f_4$ transmitted from the first point A received by said first receiving means, is mixed and detected in a mixer detector 12 together with the modulated carrier wave $f_4$ in the slave station positioned at the second point B. The first difference signal $f_5$ produced thereby has a center frequency of 42 mc., and has been amplitude modulated by a difference frequency $f_6$ of 1 kc. between the first and second measuring frequencies $f_2$, $f_2'$ and by the pulse of 1 kc. After amplification by an amplifier 13 this signal $f_5$ is separately detected by a detector 15 which serves to detect the amplitude modulated component (difference signal) corresponding to the difference between the first and second measuring frequencies $f_2$, $f_2'$ and by a detector 14 which serves to detect the component of the reference frequency $f_1$ transmitted from the first point A. In the embodiment shown, after detection the first difference signal $f_6$ and the pulse signal $f_1$ can be separately detected by means of a low pass filter and a high pass filter.

The phases of the first difference signal $f_6$ and of the reference frequency signal $f_1$ which have been separately detected are compared by the detectors 14 and 15 to obtain a signal having a value corresponding to the deviation of said phase difference between the first difference signal $f_6$ and the reference frequency signal $f_1$ from the value determined by a phase comparator 16, said signal being utilized to control a phase adjuster 17 of the second measuring frequency $f_2'$ to always restore said phase difference to a preselected value. When a discriminator circuit is employed as the phase comparator the output will become zero when the phase difference between said two signals $f_1$ and $f_6$ is equal to $\pi/2$ whereas a positive or negative voltage will be produced when the phase difference deviates from $\pi/2$. It is possible to always maintain the phase difference between said two signals $f_1$, $f_2$ at $\pi/2$ by applying said output voltage to a reactance tube, a variable capacity diode and the like connected to the generator 18 of the second measuring frequency $f_2'$.

In the master station positioned at the first point A, the second modulated carrier wave $f_4'$ transmitted from the second point B is received by the second receiving means (not shown) and mixed detected by the second mixer detector 5 together with the first modulated carrier wave $f_1$ in the master station positioned at the first point A. In the case utilizing the above mentioned numerical values, the second difference signal $f_7$ has its center frequency at 42 mc. and is modulated by a difference frequency component (1 kc.) between the first and second measuring frequencies $f_2$, $f_2'$. This second difference signal is further amplified and detected by an amplifier 6 to detect a difference frequency component. The phase difference between the detected signal and the signal of the first reference signal is detected by a phase difference measuring device 7 to determine the distance to be measured. As the phase difference measuring device, any suitable device such as a goniometer may be utilized. The required distance can also be determined by measuring the difference in time between points of the same phase of the two signals.

As can be easily understood, one of the inputs applied to the phase difference measuring device is self contained at the first point A so that it is possible to consider it a stable component not affected by the transmisison path. Thus in accordance with this invention the stability of the phase difference measurement can be greatly improved over conventional systems wherein both inputs to the phase difference measuring device are transmitted over the transmission path.

The relation between the phase difference and the distance can be expressed by an equation $$\text{Distance} = \frac{PS \times (PD - FP)}{SMF \times 4\pi}$$

where PS represents the propagating speed of the electromagnetic wave, PD phase difference, FP fixed phase and SMF second measuring frequency, respectively, so that with the above illustrated numerical values $$\text{Distance} = \frac{100}{\pi} \times \left(\text{phase difference} - \frac{\pi}{2}\right) \text{ meters}$$

In a distance measuring system utilizing a continuous signal wave of the measuring frequency the phase difference will rotate one revolution at each distance corresponding to the half wave length of the measuring frequency signal so that such system can not measure a distance exceeding half wave length.

This difficulty can be overcome by so changing the measuring frequency that the coarse measurements are initially made and finally fine measurement of the distance can be made. Alternatively, by modifying the illustrated embodiment in a manner as shown by broken lines so as to directly apply a signal pulse of the reference frequency $f_1$ which is detected by the detector 14 to the modulator 10 to transmit back the signal pulse to the first point A from the second point B after modulation by the sub-carrier wave generator 19 thereby enabling the measurement of the coarse distance by measuring at the first point A the time required for the reference frequency signal to go up and back between points A and B.

Phase deviation of the fixed amount of the phase comparator is not always important because it is possible to eliminate errors caused by the phase comparator and phase adjuster by effecting measurements by utilizing, as the first measuring frequency, a frequency which is higher than the second measuring frequency by the reference frequency and another frequency which is lower by the reference frequency and then taking the mean value of the results both measurements and further by making opposite the phases of the two inputs.

While the invention has been explained by describing particular embodiments thereof, it will be apparent that improvements and modifications may be made without departing from the scope of the invention as defined in the appended claims.

What is claimed is:
1. A system of measuring distance of the type wherein a carrier wave modulated by a signal of a measuring frequency is transmitted from a master station positioned at a first point to a slave station positioned at a second point and the transmitted wave is reflected at the second point, said system comprising, in combination, a first transmitting means to transmit from said master station to said slave station a first carrier wave modulated by a signal of a first measuring frequency and a signal of a reference frequency; first receiving means at said slave station to receive said modulated first carrier wave transmitted from said master station; a second transmitting means at said slave station, to transmit from said slave station a second carrier wave modulated by a signal of a second measuring frequency, a first mixer detector at said slave station to detect said modulated second carrier wave together with said modulated first carrier wave to derive therefrom a first difference signal simultaneously with the detection of said reference frequency signal; means to control the signal of second measuring frequency so as to maintain the phase relation between said first difference signal and said reference frequency signal at a predetermined value, a second receiving means in said master station to receive said second modulated carrier wave transmitted from said slave station, a second mixer detector in said master station to detect said first modulated carrier wave together with said second modulated carrier wave transmitted from said slave station to derive therefrom a second difference signal; and, phase difference measuring means, to measure the phase difference between said second difference signal and said reference frequency signal.

2. A method of measuring distance of the type wherein a carrier wave modulated by a signal of a measuring frequency is transmitted from a first point to a second point and the transmitted wave is effectively reflected at the second point, characterized by the steps of transmitting from said first point a first carrier wave modulated by a first measuring frequency signal and a reference frequency signal transmitting from said second point a second carrier wave modulated by a signal of a second measuring frequency, after first mixing at said second point said second modulated carrier wave together with said first modulated carrier wave transmitted from said first point to derive therefrom a first difference signal simultaneously with the detection of said reference signal, controlling said second measuring frequency signal so as to maintain the phase relation between said first difference signal and said reference frequency signal at a predetermined value, mix detecting at said first point said first modulated carrier wave together with said second modulated carrier wave transmitted from said second point to derive therefrom a second difference signal and indicating distance between said first and second points by measuring the phase difference between said second difference signal and said reference frequency signal to determine the distance.

3. A method of measuring distance of the type wherein a carrier wave modulated by a signal of a measuring frequency is transmitted from a first point to a second point and the transmitted wave is effectively reflected at the second point, characterized by the steps of transmitting from said first point a first carrier wave modulated by a signal of a first measuring frequency and a signal of a sub-carrier wave modulated by a signal from a reference frequency mathematically related to the sub-carrier frequency, transmitting from said second point a second carrier wave modulated by a signal of a second measuring frequency, after first mixing at said second point said second modulated carrier wave together with said first modulated carrier wave transmitted from said first point to derive therefrom a first difference signal simultaneously with the detection of said reference signal, controlling said second measuring frequency signal so as to maintain the phase relation between said first difference signal and said reference frequency signal at a predetermined value, mix detecting at said first point said first modulated carrier wave together with said second modulated carrier wave transmitted from said second point to derive therefrom a second difference signal, indicating distance between said first and second points by measuring the phase difference between said second difference signal and said references frequency signal to determine the distance while at the same time returning a second modulated carrier wave modulated by the reference frequency signal detected at the second point and measuring at said first point the time required for said reference frequency signal to go and return to measure the coarse distance.

References Cited by the Examiner

UNITED STATES PATENTS 3,078,460  2/63  Werner et al. _____ 343—12

CHESTER L. JUSTUS, *Primary Examiner.*